United States Patent
Fankhauser et al.

(10) Patent No.: US 10,922,324 B2
(45) Date of Patent: *Feb. 16, 2021

(54) IDENTIFYING AND SCORING DATA VALUES

(71) Applicant: International Business Machines Corporation, Armonk, NY (US)

(72) Inventors: Michael Fankhauser, DN Karkur (IL); Joshua Fox, Emek Haela (IL); Benjamin Halberstadt, Jerusalem (IL); Roger K. Hecker, Efrat (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 168 days.

This patent is subject to a terminal disclaimer.

(21) Appl. No.: 15/877,278

(22) Filed: Jan. 22, 2018

(65) Prior Publication Data

US 2018/0143984 A1 May 24, 2018

Related U.S. Application Data

(63) Continuation of application No. 14/724,763, filed on May 28, 2015, now Pat. No. 9,886,489, which is a continuation of application No. 14/494,114, filed on Sep. 23, 2014, now Pat. No. 9,684,694.

(51) Int. Cl.
| | | |
|---|---|---|
| *G06F 17/00* | (2019.01) | |
| *G06F 16/2457* | (2019.01) | |
| *G06Q 10/00* | (2012.01) | |
| *G06F 16/248* | (2019.01) | |
| *G06F 16/33* | (2019.01) | |
| *G06F 16/338* | (2019.01) | |

(52) U.S. Cl.
CPC ...... *G06F 16/24578* (2019.01); *G06F 16/248* (2019.01); *G06F 16/334* (2019.01); *G06F 16/338* (2019.01); *G06Q 10/00* (2013.01)

(58) Field of Classification Search
CPC ............ G06F 16/24578; G06F 16/338; G06F 16/334; G06F 16/248; G06F 16/335; G06Q 10/00
See application file for complete search history.

(56) References Cited

U.S. PATENT DOCUMENTS

| | | |
|---|---|---|
| 7,340,466 B2 | 3/2008 | Odom et al. |
| 8,082,240 B2 | 12/2011 | Bertran et al. |
| 8,527,451 B2 | 9/2013 | Heidasch |
| 8,589,791 B2 | 11/2013 | Caldwell et al. |

(Continued)

OTHER PUBLICATIONS

"InfoSphere Business Glossary," [online] IBM Software [retrieved May 13, 2014] retrieved from the Internet: <http://www-03.ibm.com/software/products/en/ibminfobusiglos>, 2 pg.

(Continued)

*Primary Examiner* — Greta L Robinson
(74) *Attorney, Agent, or Firm* — Cuenot, Forsythe & Kim, LLC

(57) ABSTRACT

Text including at least a first term can be presented on a display. A first score can be determined for the first term. The first score can be based, at least in part, on a lifecycle of the first term. The first score can be assigned to a first data value. The first data value can be presented on the display.

16 Claims, 3 Drawing Sheets

(56) References Cited

U.S. PATENT DOCUMENTS

| | | | |
|---|---|---|---|
| 9,460,195 | B1 | 10/2016 | Zhang |
| 9,684,694 | B2 | 6/2017 | Fankhauser et al. |
| 9,880,997 | B2 * | 1/2018 | Misra ................ G06F 17/2785 |
| 9,886,489 | B2 * | 2/2018 | Fankhauser ....... G06F 16/24578 |
| 10,394,543 | B2 * | 8/2019 | Muller ................ G06Q 10/101 |
| 2005/0125433 | A1 | 6/2005 | Akaboshi |
| 2005/0256831 | A1 | 11/2005 | Yang |
| 2006/0212350 | A1 | 9/2006 | Ellis |
| 2008/0209329 | A1 | 8/2008 | DeFranco |
| 2009/0287685 | A1 * | 11/2009 | Charnock ............... G06F 16/38 |
| 2010/0010968 | A1 | 1/2010 | Redlich |
| 2010/0070517 | A1 | 3/2010 | Ghosh et al. |
| 2010/0100541 | A1 | 4/2010 | Tsuzuki et al. |
| 2010/0114561 | A1 | 5/2010 | Yasin |
| 2010/0169367 | A1 | 7/2010 | Lee et al. |
| 2010/0169769 | A1 | 7/2010 | Jimenez et al. |
| 2011/0004606 | A1 | 1/2011 | Aumann et al. |
| 2011/0055228 | A1 | 3/2011 | Tsuchida et al. |
| 2011/0307498 | A1 * | 12/2011 | McFarlane ............ G06F 16/334 707/749 |
| 2012/0005576 | A1 | 1/2012 | Assadollahi |
| 2012/0117082 | A1 | 5/2012 | Koperda et al. |
| 2012/0124104 | A1 | 5/2012 | Bhandari et al. |
| 2012/0254802 | A1 | 10/2012 | Tinkler |
| 2013/0086076 | A1 | 4/2013 | Pandit et al. |
| 2013/0238596 | A1 | 9/2013 | Mandelstein et al. |
| 2013/0246129 | A1 | 9/2013 | Chandrasekaran et al. |
| 2013/0275120 | A1 | 10/2013 | Degross |
| 2014/0032210 | A1 | 1/2014 | Baker |
| 2014/0095527 | A1 | 4/2014 | Mohania et al. |
| 2014/0281944 | A1 | 9/2014 | Winer |
| 2014/0289215 | A1 | 9/2014 | Pearson et al. |
| 2014/0358911 | A1 | 12/2014 | McCarthy |
| 2015/0169666 | A1 | 6/2015 | Mandelstein |
| 2016/0085755 | A1 | 3/2016 | Fankhauser et al. |
| 2016/0085756 | A1 | 3/2016 | Fankhauser et al. |
| 2017/0242918 | A1 | 8/2017 | Fankhauser et al. |
| 2020/0175024 | A1 | 6/2020 | Fankhauser et al. |

OTHER PUBLICATIONS

"Introduction to Glossary Business," [onlione] Actiview Information Management & Analytics, Actiview Ltd., Apr. 7, 2011, retrieved from the Internet: <www.actiview.co.il/_Uploads/dbsAttachedFiles/BG_overview_en.pdf>, 21 pg.

"Adaptive Business Glossary manager, Data Dictionary," [onlione] Adaptive, Inc. © 2014, retrieved May 12, 2014, retrieved from the Internet: <http://www.adaptive.com/products/adaptive-business-glossary-manager/>, 2 pg.

IBM: List of IBM Patents or Patent Applications Treated as Releated, 2 pg.

Fankhauser et al., "Identifying and Scoring Data Values", U.S. Appl. No. 14/494,114, filed Sep. 23, 2014, 25 pages. (A copy is not provided as this application is available to the Examiner).

Fankhauser et al., "Identifying and Scoring Data Values", U.S. Appl. No. 14/724,763, filed May 28, 2015, 25 pages. (A copy is not provided as this application is available to the Examiner).

Fankhauser et al., "Identifying and Scoring Data Values", U.S. Appl. No. 15/587,502, filed May 5, 2017, 25 pages. (A copy is not provided as this application is available to the Examiner).

* cited by examiner

IDENTIFYING AND SCORING DATA VALUES

BACKGROUND

The present invention relates to data searches in a computing environment.

It is common for large organizations to maintain a vocabulary of terms used by those organizations. Such terms may be terms of art, which are words or phrases that have a specific meaning within a given discipline or field, or terms created and defined within the organization itself. One product that may be used to maintain such a vocabulary is IBM® InfoSphere® Business Glossary. IBM® InfoSphere® Business Glossary provides a platform for creating and managing an enterprise vocabulary and classification system. When developing new data assets, information technology personnel can reference terms contained in the system to create links between the terms and the data assets.

SUMMARY

A method includes presenting on a display text including at least a first term. The method also can include determining, using a processor, for the first term a first score, the first score based, at least in part, on a lifecycle of the first term. The method also can include assigning the first score to a first data value. The method also can include presenting on the display the first data value.

Another method includes querying an enterprise glossary to identify other terms that match a first term. The method also can include identifying data assets to which each of the other terms that match the first term are linked and which include data values for the other terms, and assigning to each of the data assets a first score indicating a level of relevance of the respective data asset to an enterprise. The method also can include determining a frequency distribution of the data values in the data assets. The method also can include, based at least on the first scores indicating the level of relevance of the respective data assets to the enterprise and the frequency distribution of the data values in the data assets, assigning, using a processor, second scores to each of the data values. The method also can include presenting a plurality of the data values which are assigned highest of the second scores.

DETAILED DESCRIPTION

Figure 1:
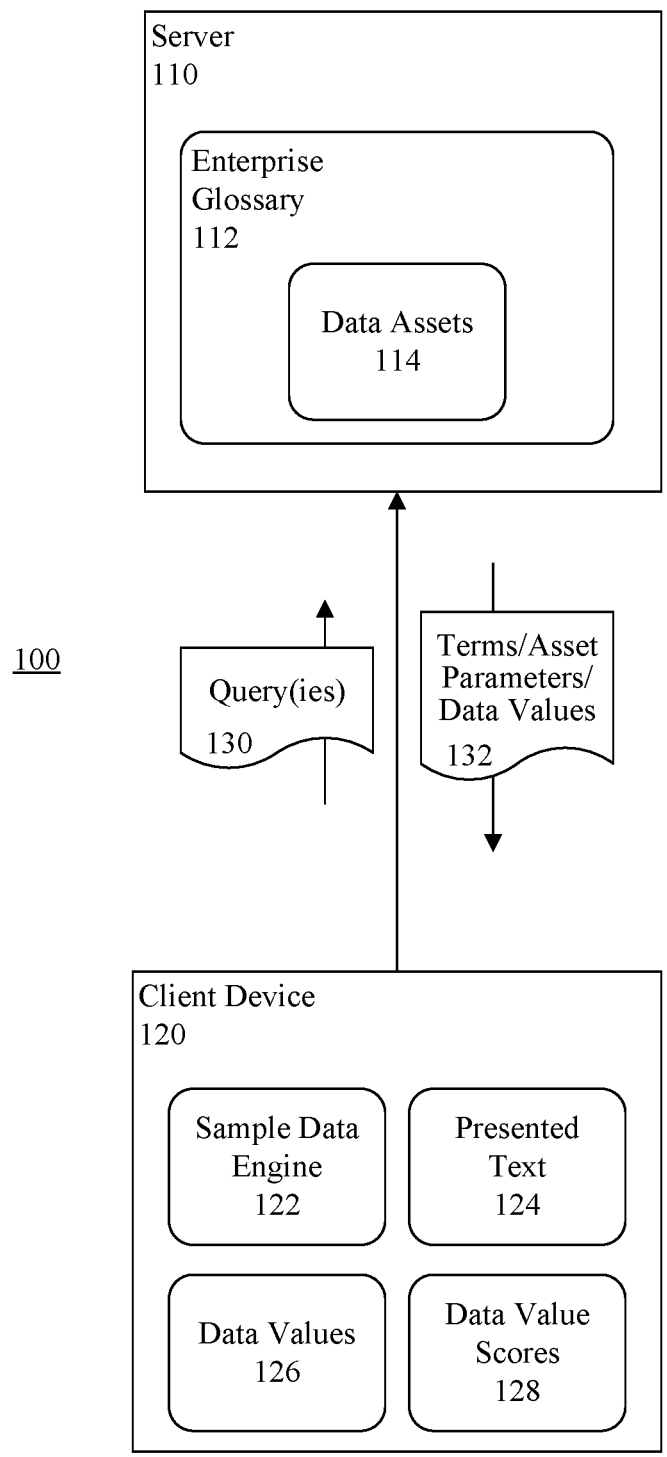
FIG. 1 is a block diagram illustrating an example of a computing environment.

While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to data searches in a computing environment and, more particularly, to identifying sample terms that aid a user in understanding another term. In illustration, text including a plurality of terms can be presented to a user on a display. For example, the user can open an email or text message on the display. The text can include a plurality of terms, some of which may be business terminology and contained in an enterprise glossary. In this regard, one or more of the terms may have a particular meaning as used in an organization. A sample data engine executing on the user's client device, or another processing system communicatively linked to the client device, can query the enterprise glossary to retrieve data values that may be relevant to terms presented in the text. The sample data engine can score the data values and present those data values having the highest score to the user. These data values help the user in understanding one or more terms contained in the text.

By way of example, the user may receive an email asking the user to draft a report pertaining to a region of transaction origin. The user may not know exactly what level geographic granularity (e.g., "country," "state," "province," "county" or "city") is intended by the term "region." The sample data engine can query the enterprise glossary to retrieve data values corresponding to the term "region," as well data values corresponding to identified synonyms of the term "region," and score each the data values. In this example, the data values "Saxony," "East Flanders" and "Cardiff" may receive the highest scores. Hence, these data values can be presented to the user to help the user glean an understanding of the level of geographic granularity intended by use of the term "region" in the text. For instance, based on these data values, the user can determine that the level geographic granularity intended by use of the term "region" in the text means a state or province.

Several definitions that apply throughout this document now will be presented.

As used herein, "term" means a word or phrase.

As used herein, the term "data asset" means data that is classified within a classification system. Such classification system, for example, can provide a way to assess individual data assets and groupings of data assets, as well as assess their use.

As defined, herein, the term "enterprise glossary" means a platform for creating and managing an enterprise vocabulary and classification system. An enterprise glossary typically includes a plurality of data tables among which terms used in the enterprise vocabulary, their definitions, and other information related to the terms are stored. Within an "enterprise glossary," links between terms and data assets can be created and managed. In this regard, an enterprise glossary can include a plurality of data assets.

As used herein, the term "data value" means a value assigned to a data asset. A plurality of data values can be assigned to a particular data asset. Moreover, a particular data value can be assigned to one or more data assets.

As defined herein, the term "responsive to" means responding or reacting readily to an action or event. Thus, if a second action is performed "responsive to" a first action, there is a causal relationship between an occurrence of the first action and an occurrence of the second action, and the term "responsive to" indicates such causal relationship.

As defined herein, the term "server" means a processing system, including at least one processor, that hosts services accessed by client devices.

As defined herein, the term "client device" means a processing system, including at least one processor, that accesses at least one service hosted by a server. Examples of a client device include, but are not limited to, a workstation, a desktop computer, a laptop computer, a tablet computer, a netbook computer, a smart phone, a personal digital assistant, a network appliance, and the like.

As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "display" means an output device that presents information in a visual form. A display sometimes is known as a monitor. Examples of a display include, but are not limited to, a computer display, a touchscreen display, a television, and the like.

As defined herein, the term "computer readable storage medium" means a storage medium that contains or stores program code for use by or in connection with an instruction execution system, apparatus, or device. As defined herein, a "computer readable storage medium" is not a transitory, propagating signal per se.

As defined herein, the term "real time" means a level of processing responsiveness that a user or system senses as sufficiently immediate for a particular process or determination to be made, or that enables the processor to keep up with some external process.

As defined herein, the term "output" means storing in memory elements, writing to display or other peripheral output device, sending or transmitting to another system, exporting, or the like.

As defined herein, the term "automatically" means without user intervention.

As defined herein, the term "user" means a person (i.e., a human being).

As defined herein, the term "steward" means a person (i.e., a human being) tasked with responsibility for managing one or more terms in an enterprise glossary.

FIG. 1 is a block diagram illustrating an example of a computing environment 100. The computing environment 100 can include at least one server 110 hosting an enterprise glossary 112 and at least one client device 120. The client device 120 can be communicatively linked to the server 110 via one or more networks to access the enterprise glossary 112. A network is the medium used to provide communications links between various devices and data processing systems connected together within the computing environment 100. The network may include connections, such as wire, wireless communication links, or fiber optic cables. The network can be implemented as, or include, any of a variety of different communication technologies such as a WAN, a LAN, a wireless network, a mobile network, a Virtual Private Network (VPN), the Internet, the Public Switched Telephone Network (PSTN), or the like.

The client device 120 can execute a sample data engine 122. The sample data engine 122 can be an application, service or the like executed by a processor of the client device 120. The sample data engine 122 can identify data values 126 corresponding to terms contained in text 124 presented to a user by the client device 120. The sample data engine 122 also can identify other terms (e.g., synonyms) matching the terms contained in text 124, and identify data values 126 corresponding to the matching terms. The sample data engine 122 can assign scores 128 to each of the identified data values and, based on the scores 128, select certain data values 126 to present to the user to aid the user's understanding of the term(s) contained in the text.

To identify the data values 126 for a particular term, the sample data engine 122 can interface with the enterprise glossary 112 to identify data assets 114 associated with a term and data assets 114 associated with other terms that are synonymous with the term. Further, the sample data engine 122 can identify data values 126 associated with those data assets 114 that are also associated with the term (or synonym). Based on such association, the sample data engine 122 can identify such data values 126 as corresponding to the particular term.

In illustration, the presented text 124 can be text of an email, text message, document, or the like presented to the user via a display. The display can be a component of, or coupled to, the client device 120. The presented text 124 can include a plurality of terms. In one arrangement, responsive to the user selecting a particular term, for example using a cursor or touchscreen, the sample data engine 122, in real time, can communicate a query 130 identifying the selected term to the enterprise glossary 112. Responsive to the query 130, the enterprise glossary 112, in real time, can communicate to the sample data engine 122 information 132 corresponding to the selected term and information corresponding to other terms that match the selected term, for example information for terms that are synonyms of the selected term. Such information 132 also can include the matching terms, data values for the selected term(s) and matching terms, and parameters corresponding to data assets 114 associated with the data values. Based on the information 132, the sample data engine 122, in real time, can assign to each data value 126 a score, and present to the user the data values 126 having the highest data value scores 128. Presentation of such data values 126 can facilitate user understanding the selected term.

In another arrangement, responsive to the email, text message, document, or the like being opened by the user, the sample data engine 122, in real time, can parse terms from the presented text 124 and communicate to the enterprise glossary 112 one or more queries 130 indicating the terms. Responsive to the query(ies) 130, the enterprise glossary 112 can communicate to the sample data engine 122, for each term recognized by the enterprise glossary 112, information 132 corresponding to the recognized terms and information corresponding to other terms that match the recognized terms, for example information for terms that are synonyms of the recognized terms. Such information 132 also can include the matching terms, data values for the recognized term(s) and matching terms, and parameters corresponding to data assets 114 associated with the data values. For each term contained in the presented text 124 that is also contained in the enterprise glossary 112 and for each matching term, the sample data engine 122, in real time, can identify data values 126 corresponding to such term(s) and generate corresponding scores 128 for the identified data values 126. The sample data engine 122 can present to the user, for one or more of the terms contained in the presented text 124, the corresponding data values 126 having the highest data value scores 128.

Regardless of when the data values 126 corresponding to terms in the presented text 124 are identified, the number of corresponding data values 126 that are presented can be limited to those data values having highest level of relevance (i.e., scores 128) to an enterprise. The number of data values 126 that are presented can be determined based on a user setting or a default setting, and/or can be based on selecting those corresponding data values 126 having a score 128 equal to or higher than a threshold value. For example, a user setting can indicate that the five corresponding data values 126 having the highest scores 128 are to be presented. Accordingly, the five corresponding data values 126 having the highest scores 128 can be presented to the user.

To select the data values 126 corresponding to a particular term, based on the information 132, the sample data engine 122 can select data values 126 associated with that term as well as data values 126 associated with other terms matching the particular term, for example other terms that are synonyms of the term. In this regard, for any given term, there may be one or more matching terms, and the data values 126 can be selected not only by processing the selected term, but also by processing one or more matching terms. Further, the data value score 128 assigned to each data value 126 can be based on a score assigned to the term with which the data value 126 is associated, scores assigned to data assets 114 with which the data value 126 is linked, and scores assigned to various instances of the data value as used in the enterprise glossary 112 and/or other data assets 114. Accordingly, the sample data engine 122 can evaluate the overall usage of terms and their respective data values in an enterprise environment when selecting data values to present to the user to aid the user in understanding a particular term presented in the text 124.

In illustration, for each selected term and each term identified as matching the selected term, the sample data engine 122 can assign a score to the term based in the information 132 received from the enterprise glossary 112. The score can indicate a level of relevance of the term to an enterprise for which the enterprise glossary 112 is provided. In illustration, the score (σ) of a particular term (t) can be calculated as follows:

$$\sigma(t) = \Sigma_{s \in S} \sigma(s)$$

where S is a set of characteristics (s) of the term (t). Thus, the score σ(t) of a term can be a sum of the scores (σ) of the set (S) of the characteristics (s) of the term. The set (S) of characteristics (s) for each term (t) can include attributes of the term including whether the term is a preferred synonym for one or more other terms, whether the term is deprecated and curation parameters.

A term can have a lifecycle, for example a term can be assigned as a draft term, can be approved, can be published, can be indicated as no longer being an approved term, etc. The depreciation of a term can represent the state of the term in this lifecycle. For example, a term that is a draft term can have greater depreciation than an approved term, and an approved term can have greater depreciation than a published term, and a term that is no longer approved can have a greater depreciation than a draft, approved or published term. Curation parameters can include, for example, an indicator of whether a steward is assigned to the term, an indicator of whether a definition is assigned to the term, an indicator of whether a label is assigned to the term, and whether other attributes are assigned to the term. The set (S) of characteristics (s) of the term also can include parameters related to data assets 114 linked to the term, including rules and policies, business intelligence (BI) reports, and data models. By way of example, the following term characteristics (s) can have, by default, the following associated scores σ(s):

Term Attributes:
Preferred Synonym: σ(s)=+50
Deprecated: σ(s)=−50
Curation
    A Steward is Assigned: σ(s)=+5
    A Definition is Assigned: σ(s)=+5
    A Label is Assigned: σ(s)=+5
    Other Attributes are Assigned: σ(s)=+5
Data Assets Linked to Term:
Rules and Policies: σ(s)=+5
BI Reports: σ(s)=+5
Data Models: σ(s)=+5

The above scores for each characteristic can be based on default scores assigned to the particular parameters or can determined by an iterative training process using standard machine learning techniques, and can be updated from time to time based on the iterative training. For example, the machine learning techniques can be used to adjust the weighting, and thus the scores, assigned for each parameter. In illustration, user feedback based on scored assigned to the parameters can be processed by a machine learning system to fine tune the weighting of the various attributes.

In addition to scoring each term, based on the information 132, the sample data engine 122 also can profile the data assets 114 to which each term is linked in the enterprise glossary 112 and which include data values for the terms. For example, the sample data engine 122 can assign scores to the data assets 114. Such scores can indicate a level of relevance of the data assets 114 to the enterprise. Accordingly, such scores can indicate a level of relevance of data values linked to such data assets 114 to the enterprise.

By way of example, if the data values for a particular data asset 114 are masked or obfuscated, the data asset 114 can be assigned a value of zero. Otherwise, the score (σ) of a data asset (d) can be calculated as follows:

$$\sigma(d) = \Sigma_{s \in S} \sigma(s)$$

where S is the set of characteristics (s) of the data asset (d). Thus, the score σ(d) of a data asset can be the sum of scores (σ) of the set (S) of the characteristics (s) of the data asset. The set (S) of characteristics (s) for each data asset (d) can include attributes of the data asset including stage of the data asset (e.g., test, staging or production), downstream consumers, cleansing level, monitoring level, curation and reference data management. By way of example, the following data asset characteristics (s) can have, by default, the following associated scores σ(s):

Production data asset (i.e., the data asset is not a test or backup data asset): σ(s)=+10
Down stream data movement consumers
BI reports: σ(s)=+4 for each BI report
Databases: σ(s)=+2 for each database
Applications: σ(s)=+2 for each application
Cleansing:
    The data asset has been cleansed using a data quality tool: σ(s)=+10
Monitoring
    The data asset is monitored for data quality using a profiling tool: σ(s)=+5
    The data asset is monitored for governance using a Governance dashboard: σ(s)=+5
    The data asset is monitored for security: σ(s)=+5

Curation
A Steward is assigned to the data asset: σ(s)=+5
A Description is assigned to the data asset: σ(s)=+5
A Label is assigned to the data asset: σ(s)=+5
A Rule is assigned to the data asset: σ(s)=+5
Reference Management:
The data asset is managed by reference data tool: σ(s)=+5
Again, the above scores for each characteristic can be determined based on default scores or determined by an iterative training process using standard machine learning techniques, and can be updated from time to time based on the iterative training.

The sample data engine 122 also can assign a score to each individual data value 126 that is identified based on the information 132. Such score can indicate a determined value of frequency distribution of the data value 126 in the data assets 114, the level of relevance to the enterprise of each data asset 114 with which the data value 126 is associated, and the level of relevance to the enterprise of the identified terms (e.g., terms matching the selected term) to which the data assets 114 are linked. In illustration, the score (σ) of a data value (v) can be calculated as follows:

$$\sigma(v) = k_1|V(v)| + k_2 \frac{C_d(v)}{\sum_{d \in V(v)} C_d(v)} + k_3 \sum_{d \in V(v)} \sigma(d) + k_4 \sum_{t \in T(w)} \sigma(t)$$

where V(v) is a set of data assets 114 having a data value (v), $C_d(v) = \Sigma_{d \in V(v)} |I_d(v)|$ is the count of instances of the data value (v) in a data asset (d), $I_d(v)$ is the set of instances of data value (v) in a data asset (d), and T(w) is the set of instances of terms matching the originally identified term. Default values for the coefficients $k_1$, $k_2$, $k_3$, $k_4$ can be $k_1=100$, $k_2=10$, $k_3=15$, $k_4=25$, but again can be updated based on training using standard machine learning techniques. Nonetheless, based on the foregoing, the score 128 for a particular data value (v) can be a weighted sum of the number of data assets 114 having the particular data value, a determined frequency of that data value within the data assets 114 (i.e., frequency distribution of the data value), the score assigned to each data asset 114 having the data value (e.g., a score indicating a level of relevance to an enterprise), and the level of relevance to the enterprise of terms (e.g., originally identified term and synonyms of that term) that lead to the data value 126. Moreover, use of a particular data values across a plurality of data assets 114 (e.g., all corresponding data assets 114) can be aggregated to arrive at the score 128 for that data value.

Based on the scores assigned to the various data values, the sample data engine 122 can select those data values 126 having the highest values, and present those data values to the user to aid the user in understanding a particular term contained in the presented text 124.

Figure 2:
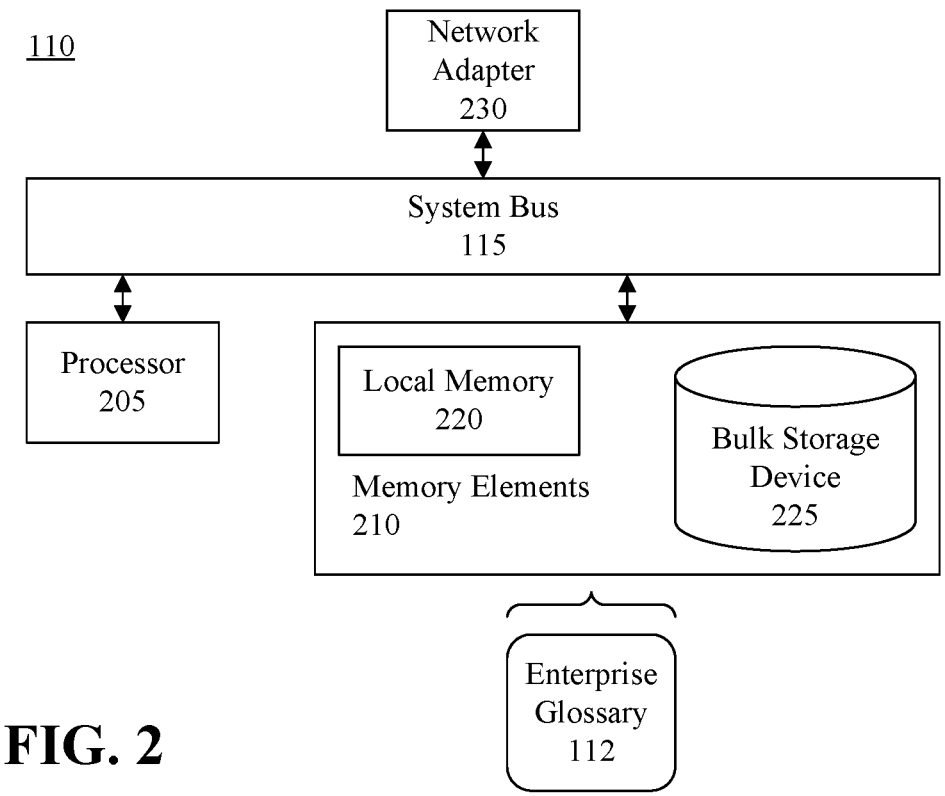
FIG. 2 is a block diagram illustrating example architecture for a server.

FIG. 2 is a block diagram illustrating example architecture for a server 110 in accordance with an embodiment disclosed within this specification. The server 110 can include at least one processor 205 coupled to memory elements 210 through a system bus 215 or other suitable circuitry. As such, the server 110 can store program code within the memory elements 210. The processor 205 can execute the program code accessed from the memory elements 210 via the system bus 215. It should be appreciated that the server 110 can be implemented in the form of any system including a processor and memory that is capable of performing the functions and/or operations described within this specification.

The memory elements 210 can include one or more physical memory devices such as, for example, local memory 220 and one or more bulk storage devices 225. Local memory 220 refers to random access memory (RAM) or other non-persistent memory device(s) generally used during actual execution of the program code. The bulk storage device(s) 225 can be implemented as a hard disk drive (HDD), solid state drive (SSD), or other persistent data storage device. The server 110 also can include one or more cache memories (not shown) that provide temporary storage of at least some program code in order to reduce the number of times program code must be retrieved from the bulk storage device 225 during execution.

One or more network adapters 230 also can be coupled to server 110 to enable the server 110 to become coupled to other systems, computer systems, remote printers, and/or remote storage devices through intervening private or public networks. Modems, cable modems, transceivers, and Ethernet cards are examples of different types of network adapters 230 that can be used with the server 110.

As pictured in FIG. 2, the memory elements 210 can store the enterprise glossary 112. Being implemented in the form of executable program code, the enterprise glossary 112 can be executed by the server 110 and, as such, can be considered part of the server 110. Moreover, the enterprise glossary 112 includes functional data structures (e.g., databases including data tables) that impart functionality when employed as part of the server 110.

Figure 3:
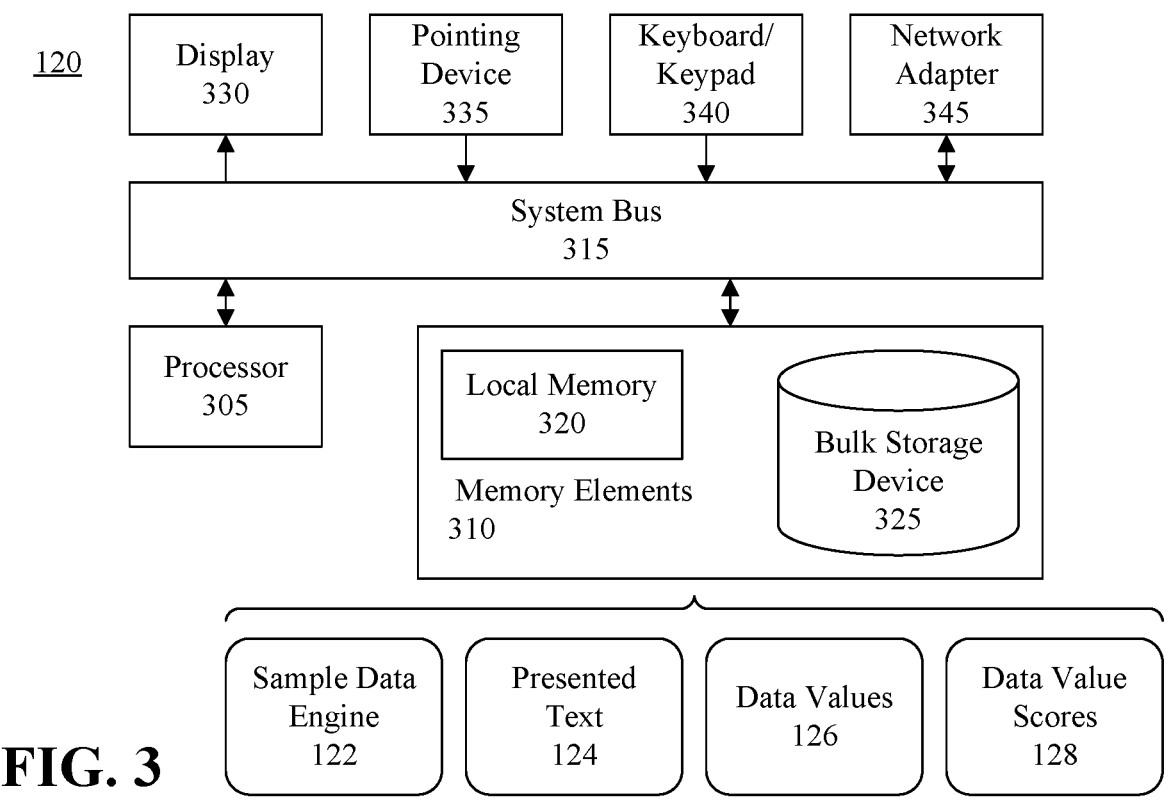
FIG. 3 is a block diagram illustrating example architecture for a client device.

FIG. 3 is a block diagram illustrating example architecture for a client device 120 in accordance with an embodiment disclosed within this specification. The client device 120 can include at least one processor 305 coupled to memory elements 310 through a system bus 315 or other suitable circuitry. As such, the client device 120 can store program code within the memory elements 310. The processor 305 can execute the program code accessed from the memory elements 310 via the system bus 315. It should be appreciated that the client device 120 can be implemented in the form of any system including a processor and memory that is capable of performing the functions and/or operations described within this specification.

The memory elements 310 can include one or more physical memory devices such as, for example, local memory 320 and one or more bulk storage devices 325. The client device 120 also can include one or more cache memories (not shown) that provide temporary storage of at least some program code in order to reduce the number of times program code must be retrieved from the bulk storage device 325 during execution.

Input/output (I/O) devices such as a display 330 and, optionally, a pointing device 335 and a keyboard 340 can be coupled to the client device 120. The I/O devices can be coupled to the client device 120 either directly or through intervening I/O controllers. For example, the display 330 can be coupled to client device 120 via a graphics processing unit (GPU), which may be a component of the processor 305 or a discrete device. One or more network adapters 345 also can be coupled to client device 120 to enable the client device 120 to become coupled to other systems, computer systems, remote printers, and/or remote storage devices through intervening private or public networks.

As pictured in FIG. 3, the memory elements 310 can store the sample data engine 122. The sample data engine 122, being implemented in the form of executable program code, is executed by client device 120 and, as such, is considered an integrated part of the client device 120. The sample data engine 122 can determine the, based on the presented text 124, the data values 126 and the data value scores 128 assigned to the data values 126. Moreover, the sample data engine 122, including any parameters and/or attributes utilized by the sample data engine 122, are functional data structures that impart functionality when employed as part of client device 120. Selected data values 126 can be output to, and stored within, the memory elements 310, as well as being output to the display 330.

Figure 4:
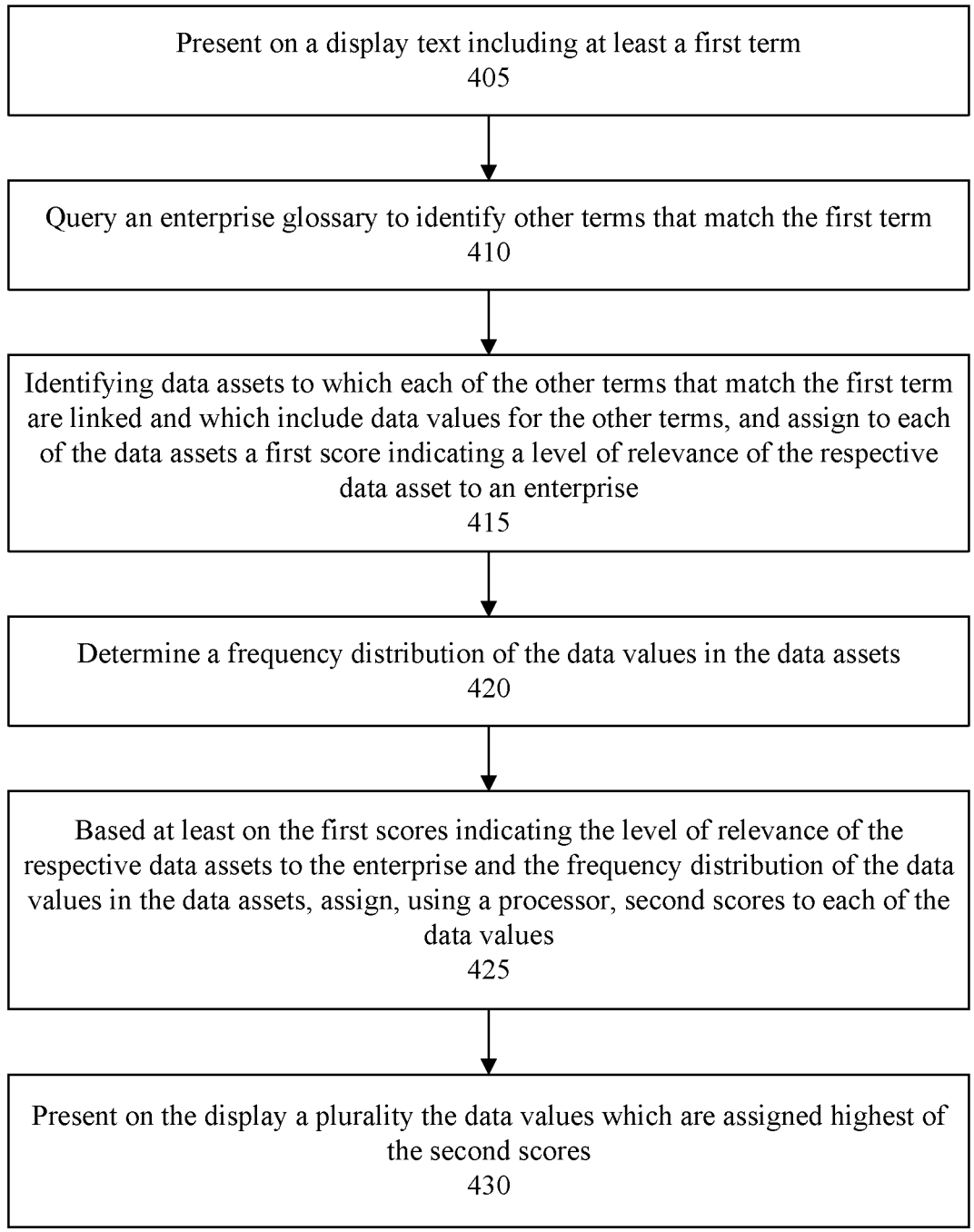
FIG. 4 is a flow chart illustrating an example of a method of presenting data values relevant to terms presented in text.

FIG. 4 is a flow chart illustrating an example of a method 400 of presenting data values relevant to terms presented in text. At step 405, text including at least a first term can be presented on a display. At step 410, an enterprise glossary can be queried to identify other terms that match the first term. At step 415, data assets to which each of the other terms that match the first term are linked and which include data values for the other terms can be identified. A first score indicating a level of relevance of the respective data asset to an enterprise assign can be assigned to each of the data assets. At step 420, a frequency distribution of the data values in the data assets can be determined. At step 425, based at least on the first scores indicating the level of relevance of the respective data assets to the enterprise and the frequency distribution of the data values in the data assets, second scores can be assigned to each of the data values using a processor. At step 430, a plurality of the data values which are assigned highest of the second scores can be presented on the display.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," or similar language means that a particular feature, structure, or characteristic described in connection with the embodiment is included in at least one embodiment described within this disclosure. Thus, appearances of the phrases "in one embodiment," "in an embodiment," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
presenting on a display text including at least a first term;
communicating at least one query including the first term to an enterprise glossary and receiving from the enterprise glossary information corresponding to the first term;
based on the information corresponding to the first term, determining, using a processor, for the first term a first score, the first score based, at least in part, on a lifecycle of the first term and at least one data asset parameter assigned to the first term;
assigning the first score to a first data value; and
presenting on the display the first data value.

2. The method of claim 1, wherein the lifecycle of the first term indicates whether the first term is a draft term, an approved term, a published term or a term that is no longer approved.

3. The method of claim 1, wherein the first score further is based, at least in part, on at least one curation parameter assigned to the first term.

4. The method of claim 3, wherein the at least one curation parameter assigned to the first term is a parameter selected from a group consisting of a parameter indicating whether a steward is assigned to the first term, a parameter indicting whether a definition is assigned to the first term, a parameter indicating whether a label is assigned to the first term, and a parameter indicating whether at least one other attribute is assigned to the first term.

5. The method of claim 1, wherein the at least one data asset parameter assigned to the first term is a parameter selected from a group consisting of a parameter indicating whether at least one rule is linked to the first term, a parameter indicating whether at least one policy is linked to the first term, a parameter indicating whether at least one report is linked to the first term, and a parameter indicating whether at least one data model is linked to the first term.

6. The method of claim 1, wherein:
the first term is linked to at least one data asset; and
the first score further is based, at least in part, on at least a second score assigned to the at least one data asset.

7. The system of claim 6, wherein the second score is based, at least in part, on at least one parameter assigned to the at least one data asset, wherein the at least one parameter is selected from a group consisting of a parameter indicating whether the at least one data asset has been cleansed using a data quality tool, a parameter indicating whether the at least one data asset is monitored for data quality, a parameter indicating whether the at least one data asset is monitored for governance, and a parameter indicating whether the at least one data asset is monitored for security.

8. The method of claim 6, wherein:
the second score is based, at least in part, on at least one curation parameter assigned to the at least one data asset; and
the at least one curation parameter assigned to the at least one data asset is a parameter selected from a group consisting of a parameter indicating whether a steward is assigned to the at least one data asset, a parameter indicting whether a description is assigned to the at least one data asset, a parameter indicating whether a label is assigned to the at least one data asset, and a parameter indicating whether at least one rule is assigned to the at least one data asset.

9. The method of claim 1, further comprising:
querying the enterprise glossary to identify other terms that match the first term;
determining for each of the other terms a respective second score, the second score based, at least in part, on a lifecycle of the other term;
assigning each second score to a respective second data value; and
presenting on the display at least a portion of the second data values which are assigned highest of the second scores.

10. A method, comprising:
querying an enterprise glossary to identify other terms that match a first term;
identifying data assets to which each of the other terms that match the first term are linked and which include data values for the other terms, and assigning to each of the data assets a first score indicating a level of relevance of the respective data asset to an enterprise;
determining a frequency distribution of the data values in the data assets;
based at least on the first scores indicating the level of relevance of the respective data assets to the enterprise and the frequency distribution of the data values in the data assets, assigning, using a processor, second scores to each of the data values; and
presenting a plurality of the data values which are assigned highest of the second scores.

11. The method of claim 10, wherein assigning, using a processor, second scores to each of the data values further is based on, for each of the data values, a third score assigned to a respective other term that matches the first term indicating a level of relevance of the other term to the enterprise.

12. The method of claim 10, wherein the second score assigned to each data value is based on a use of the data value across a plurality of the data assets.

13. The method of claim 10, further comprising:
identifying a plurality of data assets to which the first term is linked and which include data values for the first term, and assigning to each of the data assets to which the first term is linked a third score indicating a level of relevance to an enterprise;
wherein assigning, using the processor, the second scores to each of the data values further is based on the third scores.

14. The method of claim 13, wherein determining the frequency distribution of the data values in the data assets comprises determining a frequency of distribution of the data values in the plurality of data assets to which the first term is linked.

15. The method of claim 10, wherein querying the enterprise glossary to identify the other terms that match the first term is responsive to presenting on the display the text including at least the first term.

16. The method of claim 10, wherein querying the enterprise glossary to identify the other terms that match the first term is responsive to a user selection of the first term.

* * * * *